Sept. 1, 1942.   O. W. LIVINGSTON   2,294,672
ELECTRIC VALVE CIRCUIT
Filed Feb. 28, 1942
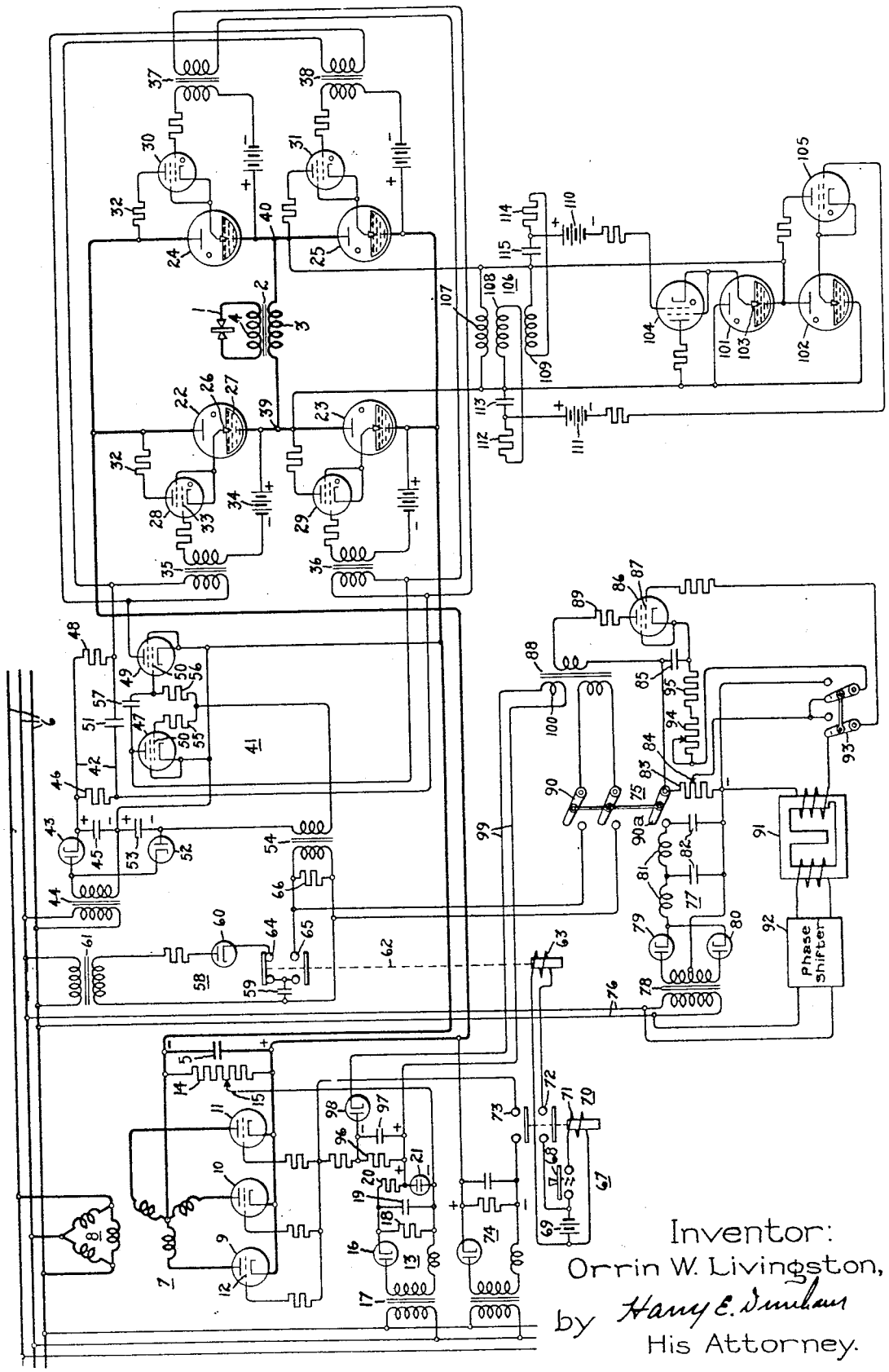
Inventor:
Orrin W. Livingston,
by Harry E. Dunham
His Attorney.

Patented Sept. 1, 1942

2,294,672

UNITED STATES PATENT OFFICE 2,294,672

ELECTRIC VALVE CIRCUIT

Orrin W. Livingston, Scotia, N. Y., assignor to General Electric Company, a corporation of New York Application February 28, 1942, Serial No. 432,902

9 Claims. (Cl. 171—97)

My invention relates to electric valve circuits and more particularly to control circuits for electric valve translating apparatus of the energy storage and dissipation type.

It has been found desirable in many systems, where intermittent or periodic energization of a load circuit is required, to charge a capacitance from a supply circuit, such as a polyphase alternating current supply circuit, during a relatively long interval of time thereby reducing the load imposed on the supply circuit, and to discharge the capacitance at the desired times to effect energization of the load circuit. This arrangement for the energization of load circuits requiring relatively heavy loads is advantageous since it permits charging of the capacitance at a relatively low rate, thereby reducing the severity of the load imposed on the alternating current supply circuit, and also permits charging of the capacitance from all phases of the supply circuit thereby reducing phase unbalance of the load imposed on the supply circuit.

In accordance with the teachings of my invention described hereinafter, I provide new and improved electric valve translating apparatus wherein certain disadvantages of the prior art arrangements are obviated.

It is an object of my invention to provide new and improved electric translating apparatus.

It is another object of my invention to provide new and improved electric valve translating apparatus for effecting a single energization of a load circuit, or for effecting periodic or intermittent energization of a load circuit.

It is a further object of my invention to provide new and improved electric valve translating apparatus wherein intermittent energization of a load circuit may be obtained by the charging and discharging of a capacitance, and whereby the system affords decided advantages in apparatus economy by employing a minimum amount of control apparatus to limit the magnitude of the reverse voltage of the capacitance after each discharge thereof.

Briefly stated, in the illustrated embodiment of my invention I provide electric translating apparatus, such as a pair of serially connected electric valve means which are connected between a capacitance and a transforming means whereby the direction of current flow to the transformer is selectively controlled without necessitating the use of cumbersome and expensive reversing contactor equipment. The system which I provide also includes means selectively responsive to the direction of current flow through the transforming means to limit the magnitude of the reverse voltage of the capacitance after each discharge thereof.

For a better understanding of my invention, reference may be had to the following description taken in connection with the accompanying drawing, and its scope will be pointed out in the appended claims. The single figure of the drawing represents an embodiment of my invention as applied to a capacitance discharge type welding system wherein a capacitor is charged from a polyphase alternating current supply circuit and discharged through the transforming means to effect energization of the load or welding circuit.

Referring to the single figure of the drawing, I have there illustrated my invention as applied to an electric translating system for energizing a load circuit, such as a welding circuit 1. The welding circuit 1 is energized from a transforming means such as a transformer 2 having a primary winding means 3 and a secondary winding means 4. I employ a capacitance 5 which is charged from a suitable supply circuit, such as a polyphase alternating current supply circuit 6, through a rectifier 7 comprising a transformer 8 and electric valve means 9, 10, and 11 which are preferably of the type employing an ionizable medium, such as a gas or a vapor, and each of which may include a control member or grid 12 which determines the amount of current conducted by the associated electric valve means.

In order to control the rectifier 7 and, hence, to control the voltage to which the capacitance 5 is charged, I employ a control circuit 13 which produces a reference voltage which is compared with a predetermined component of the capacitance voltage derived from a voltage divider 14 connected across the capacitance 5. The voltage divider may be provided with an adjustable contact 15 to furnish a negative adjustable component of voltage which is compared with the positive constant reference voltage provided by circuit 13. Adjustment of contact 15 controls the voltage to which the capacitance 5 is charged by the rectifier 7. Circuit 13 may comprise a rectifier 16, a transformer 17, and a resistance 18 through which unidirectional current is transmitted to produce across its terminals substantially constant voltage. A filtering capacitance 19 may be connected across resistance 18, if desired. In order to obtain a substantially constant reference voltage, I connect in circuit 13 a serially connected resistance 20 and a constant voltage device, such as a glow discharge valve 21, which maintains across its terminals a substantially constant voltage when in a conducting or ionized condition.

As a means for effecting discharge of the capacitance 5 through the transformer 2 and for selectively controlling the direction of current flow therethrough, I provide means, such as two electric paths or circuits connected between the primary winding means of the transformer 2 and the capacitance 5. These electric circuits or paths may be in the form of a bridge network and may comprise, respectively, pairs of electric valve means 22, 23 and 24, 25. The electric valve means 22–25 are preferably of the type employing an ionizable medium, such as a gas or a vapor, and each comprises a control member 26 which is preferably of the immersion-ignitor type constructed of a material such as boron carbide or silicon carbide and having an extremity thereof extending into a mercury pool cathode 27. The electric valve means 22–25 are normally in a nonconducting condition and are rendered conducting only when a current of suitable magnitude is transmitted to the control member 26.

To control the conductivities of the electric valve means 22–25, that is to render the electric valve means conducting, I employ control electric valves 28–31, inclusive, which are associated with electric valve means 22–25, respectively. These control electric valves are preferably connected between the anodes of the associated electric valves and the control members 26 through a current limiting resistance 32. The control electric valves 28–31 may also be of the type comprising an ionizable medium and each is provided with a control grid 33 which is normally maintained nonconducting by suitable arrangements such as batteries 34. Transformers 35–38, inclusive, which are suitably energized by apparatus described hereinafter, produce control voltages sufficient to overcome the effect of the biasing voltages and render the associated control electric valves and main electric valves selectively conductive and nonconductive.

The primary winding means 3 of the transformer 2 is connected between the common junctures 39 and 40 of the electric valve means 22, 23 and 24, 25, respectively.

I provide a control circuit 41 which produces voltages to control selectively the conductivities of the electric valve means 22–25 through the associated control electric valves so that successive impulses of current transmitted to the primary winding means 3 from the capacitance 5 are of opposite polarity; that is, the electric valves 22–25 are controlled in pairs so that diagonal electric valves are rendered conducting simultaneously, thereby providing paths for control of the direction of current flow through the primary winding means 3.

More particularly, the control circuit 41 simultaneously energizes transformers 35 and 38 to render electric valve means 22 and 25 conducting simultaneously. Control circuit 41 also produces a voltage to energize transformers 36 and 37 and to render electric valve means 23 and 24 conductive simultaneously but not in coincidence with the conduction by the electric valve means 22 and 25. In addition, control circuit 41 functions so that electric valves 22, 25 and 23, 24 are rendered conducting alternately in pairs.

Referring more particularly to the control circuit 41, I provide means for selectively energizing transformers 35, 38 and 36, 37 and which comprises a source of direct current 42 which may be provided by a suitable rectifier 43 energized from supply circuit 6 through a transformer 44. A capacitance 45 is connected across the output circuit of the rectifier, and a unidirectional voltage of the polarity indicated appears across its terminals. Circuit 41 also includes a pair of electric paths, one of which comprises in series relation an impedance element, such as a resistance 46, transformers 36 and 37 in parallel relation, and an electric discharge device 47. The other electric path comprises an impedance element, such as a resistance 48, the primary windings of transformers 35 and 38 in parallel relation, and an electric discharge device 49. The electric discharge devices 47 and 49 may be of the type employing an ionizable medium, and each includes a control member or grid 50 which serves to render the associated discharge device conducting. Suitable commutating means, such as a capacitance 51, is connected across the parallel electric paths and serves to effect transfer of current from a conducting discharge device to a non-conducting discharge device when the non-conducting discharge device is rendered conducting.

As a means for impressing a suitable negative biasing potential on grids 50 of electric discharge devices 47 and 49, I employ an auxiliary rectifier comprising a unidirectional conducting device 52 and a capacitance 53. The negative voltage appearing across capacitance 53 is impressed on grids 50 of discharge devices 47 and 49 through a transformer 54 and resistances 55 and 56. The control voltage which serves to operate the discharge devices 47 and 49 is transmitted by transformer 54 which is energized by apparatus described hereinafter. In order to assure that only one of the discharge devices, 47 or 49, is rendered conducting upon the occurrence of an impulse of control voltage during the initiation of operation of circuit 41, I provide a capacitance 57 which produces dissymmetry in the voltages impressed on grids 50 of the discharge devices 47 and 49.

Impulses of control voltage are impressed on grids 50 of discharge devices 47 and 49. Transformer 54 is energized by a control or initiating circuit 58 which comprises a capacitance 59 which is charged through a rectifier 60 from a transformer 61 which, in turn, may be connected to the supply circuit 6. Circuit controlling means, such as a relay 62, may be employed to control the time of energization of the transformer 54. Relay 62 is provided with an actuating coil 63 and contacts 64 and 65. Contacts 64 of relay 62 are connected in the charging circuit for the capacitance 59, and contacts 65 are connected in the discharging circuit of the capacitance. A resistance 66 may be connected in the discharging circuit for the capacitance. Transmission of current to the welding circuit 1 may be controlled by means of circuit 67 which may include a manually operable switch 68, a source of energizing current such as a battery 69 and a relay 70. Relay 70 is provided with an actuating coil 71 and two pairs of contacts 72 and 73, the former of which are connected in circuit with the actuating coil 63 of relay 62 so that upon closure of the manually operable switch 68, relay 62 is energized causing discharge of capacitance 59 through transformer 54 and thereby initiating the transmission of current to the welding circuit 1. Contacts 73 of relay 70 prevent the charging operation of the capacitance 5 by rectifier 7 during the discharging operation of the capacitance by impressing a negative unidirectional biasing potential on grids 12 of electric valve means 9-11, inclusive. I employ a circuit 74 which produces such a biasing potential and which is selectively connected to or disconnected from the control grids 12 through contacts 73 of relay 70.

Where it is desirable to effect recurrent or intermittent energization of the welding circuit 1, I provide means for transmitting periodic or recurring impulses of energizing voltage to transformer 54. In order to effect intermittent energization of the welding circuit 1, I employ a timing circuit 75 which may be energized from the supply circuit 6 through circuit 76. Circuit 75 comprises a rectifier 77 which may be of the biphase type including a transformer 78 and rectifying means 79 and 80. Filtering means comprising inductances 81 and capacitances 82 may be connected to the output circuit of the rectifier 77 to produce across the terminals of a voltage divider a substantially constant unidirectional voltage. The voltage divider may comprise a resistance 83 having a movable tap or adjustable contact 84. In order to produce a periodic timing voltage, I employ a capacitance 85 which is charged from the rectifier 77 and which is periodically discharged by an electric valve or electric discharge device 86. Electric discharge device 86 is provided with a grid 87 the potential of which periodically rises to a value sufficient to render the discharge device 86 conducting and thereby effects discharge of capacitance 85 through a circuit including a transformer 88, a resistance 89 and the anode-cathode circuit of the discharge device 86. A suitable switch 90, which may be manually or automatically operated is connected between transformer 54 and transformer 88. Switch 90 may be provided with an auxiliary contact 90a which is connected in the timing circuit to prevent operation thereof when the system is in condition for effecting only a single energization of the welding circuit 1 by operation of the manually operable switch 68.

Where it is desired to obtain relatively high speeds of operation of the system, that is to transmit impulses of welding current in rapid succession to the welding circuit 1, I employ means for synchronizing the occurrence of the periodic voltage produced by timing circuit 75 relative to the voltage of supply circuit 6. In order to obtain this synchronization, I may employ a peaking transformer 91 energized from the supply circuit 6 through a suitable phase shifting device 92. A switch 93 may be connected in the grid circuit of the discharge device 86 to connect the grid to either the peaking transformer 91 or to the voltage divider 83 and the cathode of the discharge device 86 through resistances 94 and 95. When the switch 93 is in the position indicated on the drawing, circuit 75 is connected for synchronous operation relative to the voltage of circuit 6. When the switch 93 is in the right-hand position the system operates asynchronously relative to the voltage of circuit 6.

When the system is operated to effect intermittent operation of the welding circuit 1, it is also important to maintain the electric valves 9-11, inclusive, of the rectifier 7 in a nonconducting condition. The rectifier circuit 7 may be prevented from operating during the discharging operation of the capacitance 5 by control circuit 13 which operates in response to the operation of the timing circuit 75. To obtain this control, I may employ suitable means such as a parallel connected resistance 96 and a capacitance 97, which introduce into the control circuit 13 a negative unidirectional biasing potential sufficiently large in magnitude to maintain the electric valves 9-11 nonconducting during the discharging operation of capacitance 5. Capacitance 97 may be charged to the polarity indicated by an electric valve or unidirectional conducting device 98 from circuit 99 which is energized from the timing circuit 75 through winding 100 associated with transformer 88.

To limit the magnitude of the reverse voltage of capacitance 5 after each discharge thereof, I connect means to the transformer 2 which is selectively responsive to the direction of current transfer therethrough. This means may comprise a pair of reversely connected electric valve means 101 and 102 which are connected across the primary winding means 3. The electric valve means 101 and 102 are normally nonconductive. These electric valve means may be of the type each comprising an immersion-igniter control member 103 which renders the electric valve means conducting when a suitable current is transmitted to the control member. Control electric valves 104 and 105 are associated with the electric valve means 101 and 102 and are connected to the anodes of these main electric valves.

I provide means connected across the primary winding 3 for selectively controlling the conductivities of the electric valve means 101 and 102 in response to the direction of current therethrough so that the voltage of capacitance 5 does not reverse polarity appreciably after the discharge of the capacitance through primary winding means 3. This means may comprise a transformer 106 having a primary winding 107 connected across the primary winding means 3, and may include oppositely poled secondary windings 108 and 109, the former of which controls the conductivity of the control electric valve 105 and the latter of which controls the conductivity of the control electric valve 104. The control electric valves 104 and 105 are normally maintained nonconducting by means which produces a suitable biasing potential, such as batteries 110 and 111, respectively. The windings 109 and 108 are poled so that when electric valve means 22 and 25 conduct current, the electric valve means 101 is maintained nonconducting but permits the electric valve means 102 to conduct as soon as the voltage of the capacitance 5 tends to reverse polarity. In like manner, the windings 108 and 109 are poled so that when electric valve means 23 and 24 conduct current, the electric valve means 102 is maintained nonconducting. This control prevents a short-circuiting of the primary winding means 3 during the discharging interval.

As means for obtaining the desired control of electric valve means 101 and 102 for predetermined periods of time during the discharging operation, I provide serially connected resistance 112 and capacitance 113 connected to winding 108, and serially connected resistance 114 and capacitance 115 connected to winding 109. Capacitances 113 and 115 are provided in order that the proper electric valves of valves 101 and 102 are maintained conducting during a sufficient length of time extending into the region where the capacitance voltage tends to reverse polarity so that the proper valve may be rendered conducting to provide a path for the flow of current in the same direction through the primary winding means 3, thereby tending to prevent appreciable reversal of polarity of the capacitance 5.

The operation of the embodiment of my invention shown in the single figure of the drawing will first be explained by considering the system when it is operating to transmit a single impulse of current to the welding circuit 1. For this type of control, the switch 90 is moved to the open circuit position thereby effectively disconnecting the timing circuit 75 from the system. Capacitance 5 is charged to a predetermined voltage by means of the rectifier 7. Initiation of the energization of the welding circuit is accomplished by operating the manual switch 68 which energizes relay 70. As soon as relay 70 is closed, rectifier 7 is prevented from operation and relay 62 is energized. Upon operation of relay 62, the capacitance 59 effects energization of transformer 54, causing circuit 41 to produce a control voltage which energizes either transformers 35, 38 or transformers 36, 37, depending upon which of the electric circuits of circuit 41 is rendered conducting. For example, if the electric discharge device 47 is conducting at the time of closure of switch 68, the transmission of an impulse of current to transformer 54 will render the electric discharge device 49 conducting to effect energization of transformers 35 and 38. Upon such energization, transformers 35 and 38 render control electric valves 28 and 31 and the main electric valves 22 and 25 conducting, effecting discharge of capacitance 5 through a circuit including the positive terminal of capacitance 5, the anode-cathode circuit of electric valve means 22, the primary winding means 3, the anode-cathode circuit of electric valve means 25, and the negative terminal of capacitance 5.

The electric valve means 101 is maintained nonconducting during this discharging operation by virtue of the negative voltage impressed on the grid of the control electric valve 104. This control voltage is obtained by virtue of the polarity of winding 109. However, the control electric valve 105 is rendered conductive by virtue of the particular polarity of winding 109 and by virtue of capacitance 113 to maintain the electric valve means 102 in conductive condition. As soon as the voltage of the capacitance 5 tends to reverse polarity, the electric valve 102 begins to conduct current providing a circulating path around the primary winding means 3 to permit current to continue to flow in the same direction therethrough, thereby tending to prevent a substantial reversal of polarity of capacitance 5.

A subsequent operation of the system may be effected by release of the manual switch 68 and a reclosure thereof. Upon closure of switch 68 another impulse of current is transmitted to the transformer 54 which causes the electric discharge device 47 to be rendered conducting and commutates the current from the electric discharge device 49. Upon such operation, an impulse of current is applied to transformers 36 and 37 which causes the control electric valves 29 and 30 and the associated main valves 23 and 24 to conduct current. The capacitance 5 then discharges through a circuit including the positive terminal of capacitance 5, the anode-cathode circuit of electric valve means 24, the primary winding means 3, the anode-cathode circuit of electric valve means 23 and the negative terminal of capacitance 5. It will be observed that the direction of current flow through the primary winding means 3 at this time is the reverse of that previously described when electric valve means 22 and 25 conducted current.

During this last described operation, the electric valve means 102 is maintained nonconducting by virtue of the hold-off voltage impressed on the grid of the control electric valve 105. However, the electric valve means 101 is placed in condition for operation, that is maintained in conductive condition, and begins to conduct current as soon as the voltage of capacitance 5 tends to reverse polarity, thereby furnishing a circulating path around the primary winding means 3 which permits current to flow in the same direction through this winding.

By virtue of the fact that successive energizations of primary winding 3 are accomplished by currents of opposite polarity, it will be appreciated that residual magnetization of the core structure of the transformer 2 is of substantially no effect, thereby preventing cumulative unidirectional magnetization of the core structure which would be caused if all the impulses were of the same polarity.

The control circuit 41, by virtue of its operation, alternately energizes the pairs of transformers 35, 38 and 36, 37.

If it is desired to obtain intermittent or recurrent energization of the welding circuit 1, switch 90 may be moved to the closed circuit position so that an energizing impulse of current or voltage is transmitted to transformer 54 coincident with the production of each impulse of the periodic timing voltage produced by the timing circuit 75. With this type of operation, a series of impulses of current are transmitted to the welding circuit 1 and successive impulses of current transmitted to primary winding means 3 are of opposite polarity so that cumulative unidirectional magnetization of the core structure of transformer 3 is prevented.

The rectifier 7 is prevented from operating during the discharge of capacitance 5 when the system effects periodic energization of the welding circuit 1. This hold-off of the rectifier 7 during the discharge of capacitance 5 is effected by impressing a negative hold-off voltage on control members 12 of electric valve means 9, 10 and 11 through circuit 99 which is energized from winding 100 of transformer 88. Upon the occurrence of each periodic impulse produced by the timing circuit 75, winding 100 is energized causing the transmission of a negative impulse of current through resistance 96. The unidirectional conducting device 98 is poled so that the impulse of voltage produced by the resistance 96 is negative and the circuit is designed so that the negative voltage is sufficient to overcome the positive voltage produced by rectifier 13. This negative hold-off voltage occurs substantially simultaneously with each periodic impulse of control voltage produced by the timing circuit 75.

When switch 93 is in the position indicated, charging and discharging operations of transformer 5 are synchronized with respect to the voltage of circuit 6. This feature of control wherein the duration of the periodic timing voltage produced by circuit 75 determines the periodicity of the energization of welding circuit 1, is disclosed and claimed in my copending patent application Serial No. 423,523, filed December 18, 1941, and which is assigned to the assignee of the present application. Certain features of the system shown in this application are also disclosed and claimed in my copending patent application Serial No. 423,523. The feature of employing a pair of reversely connected electric valve means across transforming means which are energized in different directions to limit the magnitude of the reverse voltage of capacitance after discharge thereof through the transforming means, is also disclosed and claimed in my above-identified copending patent application.

While I have shown and described my invention as applied to a particular system of connections and as embodying various devices diagrammatically shown, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, a supply circuit, a load circuit, a capacitance, means for charging said capacitance from said supply circuit, a pair of electric paths connected to said capacitance and each comprising in series relation a pair of electric valve means, transforming means having primary winding means connected between the common junctures of the electric valve means of the respective pairs, means for controlling said electric valve means so that successive discharges of said capacitance flow through said primary winding means in opposite directions, and means connected across said primary winding means for preventing substantial reversal in polarity of said capacitance upon discharge thereof.

2. In combination, a supply circuit, a load circuit, a capacitance, means for charging said capacitance from said supply circuit, a pair of electric paths connected across said capacitance and each comprising in series relation a pair of electric valve means of the controlled type and each having a control member for controlling the conductivity thereof, a transformer connected to said load circuit and comprising primary winding means connected between the common junctures of the electric valve means of each pair, means for energizing the control members of said electric valve means to discharge said capacitance and for selectively controlling the conductivities of said electric valve means in order that successive discharges of said capacitance flow through said primary winding means in opposite directions, and a pair of reversely connected electric valve means connected to said primary winding means for preventing substantial reversal in the polarity of said capacitance upon discharge thereof.

3. In combination, a supply circuit, a load circuit, a capacitance means for charging said capacitance from said supply circuit, a pair of electric paths connected across said capacitance and each comprising in series relation a pair of electric valve means of the controlled type and each having a control member for controlling the conductivity thereof, a transformer connected to said load circuit and comprising primary winding means connected between the common junctures of the electric valve means of each pair, means for energizing the control members of said electric valve means to discharge said capacitance and for selectively controlling the conductivities of said electric valve means in order that successive discharges of said capacitance flow through said primary winding means in opposite directions, a pair of reversely connected electric valve means connected to said primary winding means, and means for selectively controlling the conductivities of the last mentioned electric valve means in response to the direction of current flow through said primary winding means to prevent substantial reversal in the polarity of the voltage of said capacitance upon discharge thereof through said primary winding means.

4. In combination, a supply circuit, a load circuit, a capacitance, means for charging said capacitance from said supply circuit, a pair of electric paths connected to said capacitance and each comprising in series relation a pair of electric valve means, transforming means connected to said load circuit and having primary winding means connected between the common junctures of the electric valve means of the respective pairs, said electric valve means constituting a bridge network, means for rendering diagonal electric valve means of said electric valve means conducting alternately so that successive impulses of discharge current flow through said primary winding means in opposite directions, and means for limiting the magnitude of the reverse voltage of said capacitance upon discharge thereof comprising a pair of reversely connected electric valve means connected to said transforming means and means for selectively controlling the conductivities of the last mentioned electric valve means in response to the direction of current flow through said transforming means.

5. In combination, a supply circuit, a load circuit, a capacitance, means for charging said capacitance from said supply circuit, a pair of electric circuits connected to said capacitance and each comprising in series relation a pair of electric valve means, transforming means connected to said load circuit and having primary winding means connected between the common junctures of the electric valve means in the respective pairs, means for selectively controlling the conductivities of said electric valve means so that only one electric valve means in each pair is conductive at any one time, and means comprising a pair of reversely connected electric valve means connected to said transforming means for preventing substantial reversal in polarity of the voltage of said capacitance upon discharge thereof.

6. In combination, a supply circuit, a load circuit, a capacitance, means for charging said capacitance from said supply circuit, a pair of electric circuits connected to said capacitance and each comprising in series relation a pair of electric valve means of the controlled type each having a control member for initiating an arc discharge therein, transforming means connected to said load circuit and having primary winding means connected between the common junctures of the electric valve means of the respective pairs, timing means for producing a periodic voltage to control the periodicity of the energization of said load circuit, means connected between said control members and said timing means to control selectively the conductivities of said electric valve means so that successive impulses of current transmitted to said primary winding means are of opposite polarity, and means connected to said transforming means to prevent substantial reversal in the polarity of said capacitance upon discharge thereof through the primary winding means.

7. In combination, a supply circuit, a load circuit, a capacitance, means for charging said capacitance from said supply circuit, transforming means connected to said load circuit and having primary winding means, means connected between said capacitance and said primary winding means for effecting discharge of said capacitance through said primary winding means, means for controlling the last mentioned means so that successive discharge currents of said capacitance traverse said primary winding means in opposite directions, means connected to said transforming means for preventing substantial reversal of the polarity of said capacitance after each discharge thereof and comprising a pair of reversely connected electric valve means, and means for selectively controlling the conductivities of said electric valve means in response to the direction of current flow through said transforming means comprising a transformer connected across said primary winding means and including a pair of oppositely poled secondary windings one of which is connected to control one of the electric valve maens and the other of which is connected to control the other electric valve means.

8. In combination, a supply circuit, a load circuit, a capacitance, means for charging said capacitance from said supply circuit, transforming means connected to said load circuit and having primary winding means, means connected between said capacitance and said primary winding means for effecting discharge of said capacitance through said primary winding means, means for controlling the last mentioned means so that successive discharge currents of said capacitance traverse said primary winding means in opposite directions, means connected to said transforming means for preventing substantial reversal of the polarity of said capacitance after each discharge thereof and comprising a pair of reversely connected electric valve means, and means for selectively controlling the conductivities of said electric valve means in response to the direction of current flow through said transforming means and comprising a transformer connected to said primary winding means and having a pair of oppositely poled secondary windings and a pair of capacitances each energized from a different one of said secondary windings to produce a voltage tending to maintain the associated electric valve means conductive into the region in which the voltage of said capacitance tends to reverse polarity.

9. In combination, a supply circuit, a load circuit, a capacitance, means for charging said capacitance from said supply circuit, transforming means connected to said load circuit and having primary winding means, means connected between said capacitance and said primary winding means for effecting discharge of said capacitance through said primary winding means, means for controlling the last mentioned means so that successive discharge currents of said capacitance traverse said primary winding means in opposite directions, means connected to said transforming means for preventing substantial reversal of the polarity of said capacitance after each discharge thereof and comprising a pair of reversely connected electric valve means, a pair of control electric valves each associated with a different one of said electric valve means, said control electric valves each having a control grid, and means for selectively controlling the conductivities of said control electric valves and comprising a transformer connected to said primary winding means and having a pair of oppositely poled secondary windings each connected to the grid of the different control electric valve through a circuit comprising in series relation a capacitance and a resistance for producing a voltage tending to maintain the control electric valves conductive selectively in response to the direction of current flow through said primary winding means and into the region in which the polarity of said capacitance tends to reverse.

ORRIN W. LIVINGSTON.

DISCLAIMER 2,294,672.—*Orrin W. Livingston*, Scotia, N. Y. ELECTRIC VALVE CIRCUIT. Patent dated September 1, 1942. Disclaimer filed December 1, 1943, by the assignee, *General Electric Company*.

Hereby enters this disclaimer to claims 1, 2, 3, and 5 of said patent.

[*Official Gazette December 21, 1943.*]